US011975457B2

(12) United States Patent
Chatzigrigoriou et al.

(10) Patent No.: US 11,975,457 B2
(45) Date of Patent: *May 7, 2024

(54) RAZOR HEAD WITH IMPROVED SPRING FINGERS

(71) Applicant: BIC VIOLEX S.A., Anoixi (GR)

(72) Inventors: Nikolaos Chatzigrigoriou, Anoixi (GR); Argyro Kallivretaki, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 225 days.

This patent is subject to a terminal disclaimer.

(21) Appl. No.: 17/245,016

(22) Filed: Apr. 30, 2021

(65) Prior Publication Data

US 2021/0362360 A1 Nov. 25, 2021

(30) Foreign Application Priority Data

May 20, 2020 (EP) .................................... 20175710

(51) Int. Cl.
*B26B 21/22* (2006.01)
*B26B 21/40* (2006.01)

(52) U.S. Cl.
CPC .......... *B26B 21/227* (2013.01); *B26B 21/222* (2013.01); *B26B 21/4012* (2013.01); *B26B 21/4075* (2013.01)

(58) Field of Classification Search
CPC ....... B26B 21/14; B26B 21/16; B26B 21/227; B26B 21/40; B26B 21/4012; B26B 21/4075

(Continued)

(56) References Cited

U.S. PATENT DOCUMENTS 4,492,024 A * 1/1985 Jacobson .............. B26B 21/227 30/50
4,498,235 A * 2/1985 Jacobson .............. B26B 21/227 30/47

(Continued)

FOREIGN PATENT DOCUMENTS

EP 2853362 B1 8/2016
EP 2629942 B1 7/2019

(Continued)

OTHER PUBLICATIONS

Extended European search report issued in European Patent Application No. 20175710.1, dated Nov. 9, 2020.

(Continued)

*Primary Examiner* — Jason Daniel Prone
(74) *Attorney, Agent, or Firm* — Bookoff McAndrews, PLLC

(57) ABSTRACT

A shaving blade cartridge may include a housing and at least one cutting blade mounted in a blade receiving section of the housing between first and second lateral sides of the housing, wherein the at least one cutting blade is movably supported by fingers such that the at least one cutting blade can move from a first position to at least one second position, wherein one or more fingers is designed such that the cutting blade is supported by at least one first contact point or area of the finger when the at least one cutting blade is in the first position, and in that the at least one cutting blade is supported by at least one second contact point or area of the finger when the at least one cutting blade is in the second position.

10 Claims, 4 Drawing Sheets

(58) Field of Classification Search
USPC .......................................................... 30/47–51
See application file for complete search history.

(56) References Cited

U.S. PATENT DOCUMENTS

| | | | | |
|---|---|---|---|---|
| 5,224,267 | A * | 7/1993 | Simms | B26B 21/227 30/50 |
| 5,313,706 | A * | 5/1994 | Motta | B26B 21/227 30/47 |
| 5,416,974 | A * | 5/1995 | Wain | B26B 21/227 30/50 |
| 5,426,851 | A * | 6/1995 | Gilder | B26B 21/227 30/50 |
| 5,761,814 | A * | 6/1998 | Anderson | B26B 21/227 30/50 |
| 6,035,537 | A * | 3/2000 | Apprille, Jr. | B26B 21/227 30/50 |
| 6,295,734 | B1 * | 10/2001 | Gilder | B26B 21/227 30/50 |
| 6,397,473 | B1 * | 6/2002 | Clark | B26B 21/227 30/50 |
| 8,083,064 | B2 | 12/2011 | Boswell et al. | |
| 8,689,448 | B2 * | 4/2014 | Ren | B26B 21/227 30/50 |
| 9,539,734 | B1 * | 1/2017 | Bozikis | B26B 21/4068 |
| 10,639,806 | B2 * | 5/2020 | Bozikis | B26B 21/4087 |
| 10,786,915 | B2 * | 9/2020 | Zafiropoulos | B26B 21/222 |
| 11,524,418 | B2 * | 12/2022 | Athanassiou | B26B 21/4062 |
| 11,559,912 | B2 * | 1/2023 | Saltas | B26B 21/4062 |
| 11,602,866 | B2 * | 3/2023 | Chatzigrigoriou | B26B 21/4031 |
| 11,938,641 | B2 * | 3/2024 | Chatzigrigoriou | B26B 21/227 |
| 2002/0157258 | A1 | 10/2002 | Curran | |
| 2011/0289779 | A1 * | 12/2011 | Volodin | B26B 21/227 30/50 |
| 2012/0151775 | A1 | 6/2012 | Ren | |
| 2016/0207210 | A1 * | 7/2016 | Ren | B26B 21/227 |
| 2018/0237615 | A1 | 8/2018 | Snow et al. | |
| 2021/0362361 | A1 * | 11/2021 | Chatzigrigoriou | B26B 21/4012 |
| 2022/0324128 | A1 * | 10/2022 | Bozikis | B26B 21/4068 |
| 2023/0035264 | A1 * | 2/2023 | Polygerinos | B26B 21/58 |

FOREIGN PATENT DOCUMENTS

| | | | |
|---|---|---|---|
| KR | 101460675 | B1 | 11/2014 |
| WO | 8602308 | A1 | 4/1986 |
| WO | 9217322 | A1 | 10/1992 |
| WO | 9805478 | A1 | 2/1998 |
| WO | 2011111881 | A1 | 9/2011 |
| WO | 2013050606 | A1 | 4/2013 |

OTHER PUBLICATIONS

Extended European search report issued in European Patent Application No. 20175712.7, dated Nov. 9, 2020.

* cited by examiner

RAZOR HEAD WITH IMPROVED SPRING FINGERS

CROSS-REFERENCE TO RELATED APPLICATION

This application claims benefit from European patent application EP 20175710.1 filed on May 20, 2020, its content being incorporated herein by reference.

FIELD

The present disclosure concerns the field of shaving blade cartridges, in particular shaving blade cartridges for wet razors.

BACKGROUND

Shaving blade cartridge 1 of a wet razor, wherein multiple blades 5 are movably supported within the cartridge are commonly known in the art. As described in EP 2 853 362 A1, the blades may be supported within the cartridge by means of elastic fingers so that the blades can retract into the cartridge to better adopt to the skin of a user.

The object of the present disclosure is to provide an alternative shaving blade cartridge having at least one blade which can adopt to the skin of a user during shaving. Another object of the present disclosure is to provide a shaving blade cartridge which can at least partially be manufactured from a recycled plastic material.

SUMMARY

The present disclosure relates to a shaving blade cartridge as defined in claim

1. The dependent claims depict embodiments of the same.

In one aspect, a shaving blade cartridge comprises a housing and at least one cutting blade mounted in a blade receiving section of the housing between first and second lateral sides of the housing, wherein each cutting blade is movably supported by fingers such that the at least one cutting blade can move from a first position to at least one second position. Each finger is designed such that the cutting blade is supported by at least one first contact point or area of the finger when the at least one cutting blade is in the first position, and such that the cutting blade is supported by at least one second contact point or area of the finger when the at least one cutting blade is in the second position.

Alternatively, or in addition, each finger has an at least partially curved surface on a side facing the at least one cutting blade.

An aspect of this design is that recycled plastic materials can be used for manufacturing the housing and the fingers while still having good elastic properties of the fingers for supporting the blades. Heads used for razors, are typically produced by using thermoplastics to create the casing which secures the metal blades. Thermoplastic materials are versatile, with adequate properties and allow the production of razor heads economically and in high volumes. However, razor heads have a limited use life which is in most cases defined by the blades durability. As a result, there is a growing concern that such components are not sustainable as they are produced using fossil-based plastics and have a limited lifetime usage. In order to solve this problem, it would be beneficial to use recycled plastic instead of virgin, thus eliminating the need of consuming non-renewable feedstock for the production of razor heads. However, this approach leads to razor heads with inferior mechanical properties and product performance, as recycled plastics have lower properties compared to virgin—due to their ageing and strain caused from both the original material use and the additional recycling process steps.

Plastic recycling is the process of recovering scrap or waste plastic and reprocessing the material into useful products. Since the majority of plastic is non-biodegradable, recycling is a part of global efforts to reduce plastic in the waste stream, especially the approximately 8 million metric tonnes of waste plastic that enters the Earth's ocean every year.

When different types of plastics are melted together, they tend to phase-separate, like oil and water, and set in these layers. The phase boundaries cause structural weakness in the resulting material, meaning that polymer blends are useful in only limited applications. The two most widely manufactured plastics, polypropylene and polyethylene, behave this way, which limits their utility for recycling. Each time plastic is recycled, additional virgin materials must be added to help improve the integrity and/or mechanical properties of the material. So, even recycled plastic has new plastic material added in. The same piece of plastic can only be recycled about 2-3 times before its quality decreases to the point where it can no longer be used.

The inferior properties of recycled plastics are relevant to the razor head performance when focusing for example on the cantilever spring fingers that control the blade vertical movement. Virgin plastics that are typically used for the production of razor heads (such as ABS copolymers, or Polyphenylene Oxide blends) exert a linear strain behavior as a result of an applied stress. During shaving, the pressure applied on the blades is transferred to the plastic cantilevered finger acting as a spring, which is then linearly deflected so as to compensate the pressure. Contrarily, recycled plastics have a lower flexural strength compared to virgin counterparts. Furthermore, the stress-strain behavior of recycled plastics is generally not linear. Thus, the pressure applied on the blades during shaving is non-linearly and so when applied on the cantilevered spring made with recycled plastics lead to not controlled blade movement.

The present disclosure provides a shaving blade cartridge (also called "razor head") that may be made of recycled plastic with specially designed cantilevered fingers that compensate the non-linear stress-strain behavior of recycled plastics and reassure the steady (linear) retraction of the movable blade when pressure is applied during shaving.

The at least one second contact point or area may not be in contact with the at least one cutting blade when it is in the first position. On the other hand, the at least one second contact point or area may be in contact with the at least one cutting blade when it is in the at least one second position, whereas the first contact point or area is not in contact with the at least one cutting blade when it is in that second position. With that, it is achieved that the finger provides a single contact point or area with respect to the at least one cutting blade which continuously transitions or moves from the first contact point or area to the at least one second contact point or area when the at least one cutting blade is moved from the first position to the second position. Said in other words, the contact point or area provided by the curved section of the finger is continuously moving during use towards the base of the finger i.e. the connection point of the finger with respect to the housing due to the curvy structure of the finger. In that way, during use, the torque is continuously changing as the lever arm decreases. With that, the mechanical properties are close to a conventional design using virgin plastic (i.e. non-recycled plastic).

The at least one second contact point may be closer to the neighboring lateral side of the housing on which the respective finger is connected to the housing compared to the first contact point. In particular, the distance between the first contact point or area and the at least one second contact point or area on the finger may at least be between 0.2 mm-0.6 mm, more specifically between 0.3-0.5 mm. In some examples, the distance between the first and second contact points or areas on the finger may be 0.45 mm. The lever arm provided by the finger is thus reduced when the at least one cutting blade is in the at least one second position compared to the lever arm provided by the finger when the at least one cutting blade is in the first position. The lever arm may be defined as being the distance between the surface of the neighboring lateral side facing towards the blade receiving section and the first contact point or area of the finger when the at least one cutting blade is in the first position measured in a direction extending parallel to the cutting blade in its first position, and wherein the lever arm is defined as being the distance between the surface of the neighboring lateral side facing towards the blade receiving section and the second contact point or area of the finger when the at least one cutting blade is in the at least one second position measured in a direction extending parallel to the cutting blade in its first position.

Therefore, the present disclosure allows the use of recycled plastics for the production of razor cartridges for movable blades. The use of recycled plastics assures that a non-renewable source (such as fossil-fuels) are used for the production of razor heads. Furthermore, the proposed solutions tackles the problem of the recycled plastics inferior mechanical properties, by providing a novel solution that compensates the non-linear stress-strain behaviour of recycled plastics to assure a linear and controlled retraction of the blade when pressure is applied.

A plastic razor cartridge with movable blades may be produced by injection molding and using recycled plastic. The razor head cantilever spring fingers are designed in such a way so as to compensate the non-linear stress-strain behavior of recycled plastics, thus assuring a steady and controlled linear retraction of the blades when pressure is applied and mechanical properties similar to the virgin plastic.

In examples, the at least one cutting blade extends along or in parallel to a longitudinal axis of the housing and has guided portions on both sides to be slidingly guided in slots provided in the housing. The first position of the at least one cutting blade may be defined as being a position in which the at least one cutting blade is held in the blade receiving section of the housing without any external forces acting on the at least one cutting blade. The at least one second position of the at least one cutting blade may be defined as being a position in which the at least one cutting blade is held in the blade receiving section of the housing in a retracted position with an external force acting on the at least one cutting blade such that the fingers supporting the at least one cutting blade are moved or bent towards the bottom side of the housing.

In the at least one second position, the cutting blade may be moved towards the bottom side of the housing for example by at least 0.2 m-0.6 mm mm or at least 0.3 mm. Of course, intermediate positions may occur between the first and second positions. In addition, a cutting blade does not need to move towards the bottom side of the housing on both sides to the same extent. Due to the elastic support provided by the fingers, a cutting blade may also have a slightly tilted position within the housing caused by unevenly distributed forces acting on the cutting blade.

It should be understood that the cutting blade is movably supported on each of its two lateral sides of the housing within the blade receiving section usually by a single finger, i.e. in total by two fingers by cutting blade. In case of more cutting blades, the number of fingers increases accordingly. As an example, in case of three cutting blades, six fingers are provided (three on each lateral housing side), and in case of five cutting blades, ten fingers are provided (five on each lateral housing side). Other number of blades and fingers may be foreseen.

The housing and the fingers may be formed together by a injection molding process. The housing and the fingers are at least partially or completely made of a recycled plastic material, in particular a material composition comprising one or more recycled plastic materials, or a material composition comprising a non-recycled plastic material and a recycled plastic material. However, the design substantially as described herein can—of course—also be realized by using a virgin (i.e. non-recycled) plastic material.

BRIEF DESCRIPTION OF THE DRAWINGS

Additional details and features of the disclosure are described in reference to the following figures in which.

DETAILED DESCRIPTION

Figure 1:
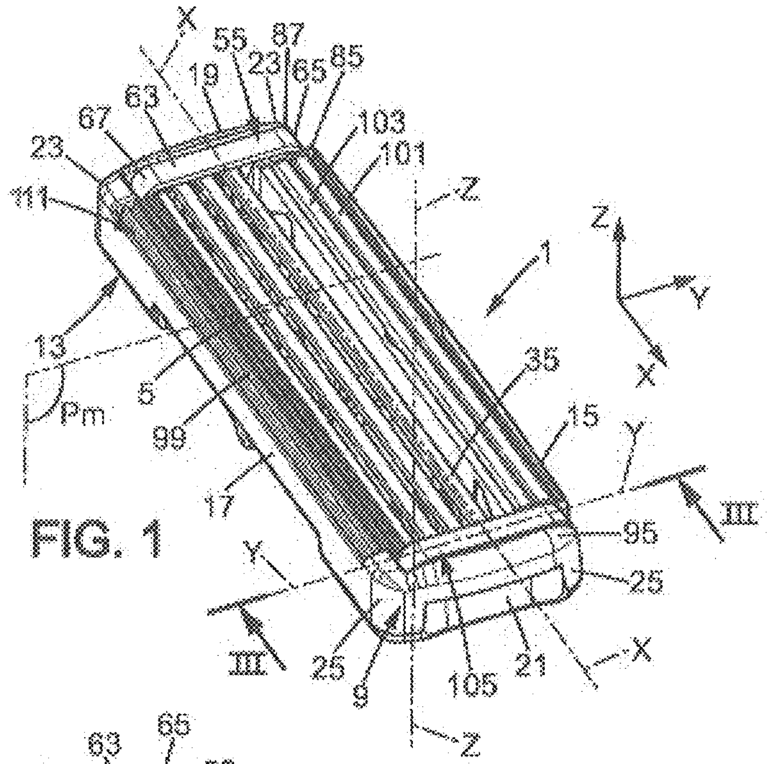
FIG. 1 shows a perspective view of a shaving blade cartridge according to an example, the cartridge comprising a housing, three blades and two clips retaining the blades in the housing.
Figure 5:
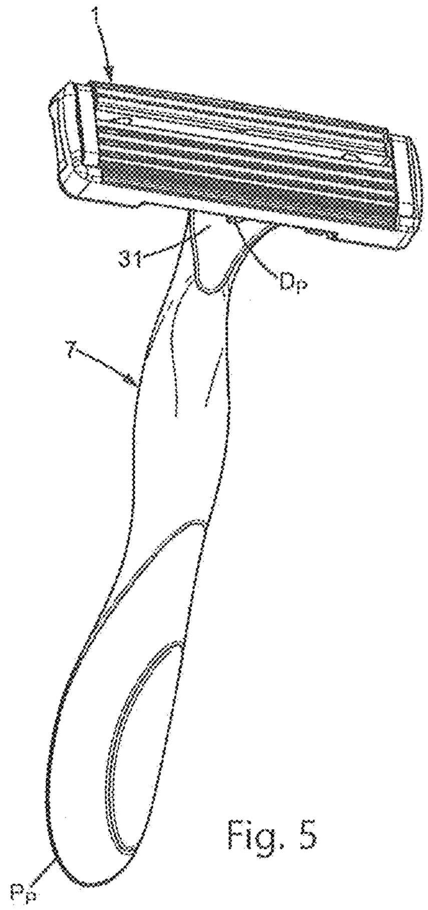
FIG. 5 shows a perspective view of a shaver comprising a handle and a cartridge according to an example.

FIG. 1 shows a shaving blade cartridge 1 of a wet razor, wherein multiple blades 5 are supported within the cartridge. The shown example has three blades 5. However, also more or less blades may be used (e.g. a single blade, two blades or five blades). As can be seen in FIG. 5, the shaving blade cartridge 1 is attached to a handle 7 extending in a handle direction between a proximal portion PP and a distal portion DP. The shaving blade cartridge 1 may pivot with regard to the handle 7. In other embodiments, the handle may also be fixed with regard to the shaving cartridge. The handle direction may be curved or include one or several straight portions. The shaving blade cartridge 1 can, for example, be releasably connected to the shaver handle 7 through a lock-and-release mechanism. The housing 9 can for example include, on its bottom side 13, a connection mechanism 31 adapted to connect the handle 7. The connection mechanism 31 can thus allow the release and/or the attachment of the shaving blade cartridge 1 to the handle 7.

Figure 2:
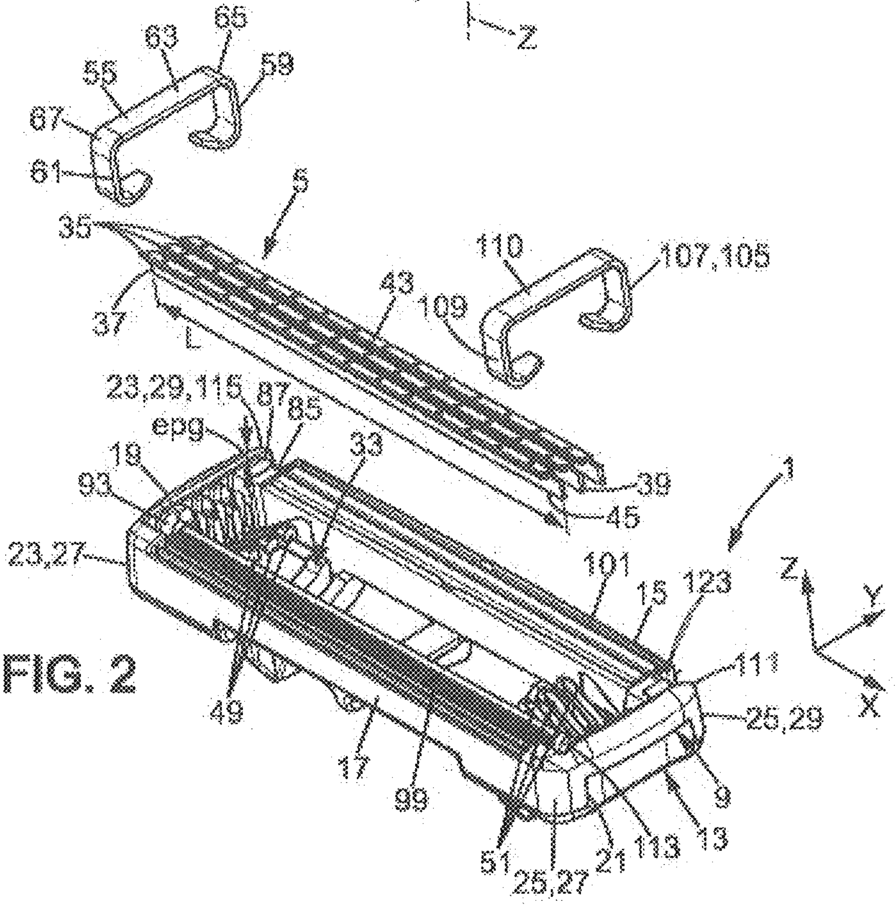
FIG. 2 shows an exploded perspective view of the shaving blade cartridge of FIG. 1.
Figure 3:
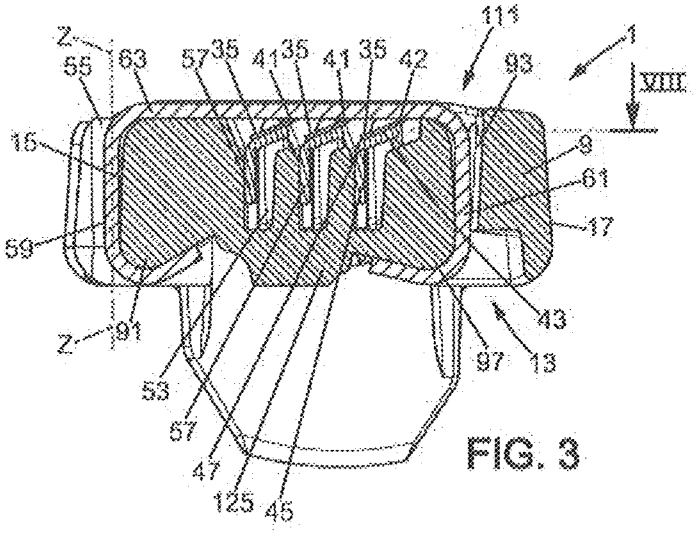
FIG. 3 shows a lateral view of the shaving blade cartridge of FIG. 1, FIGS. 4*a* and 4*b* are perspective views of a shaving blade cartridge according to a second embodiment.
Figure 4A:
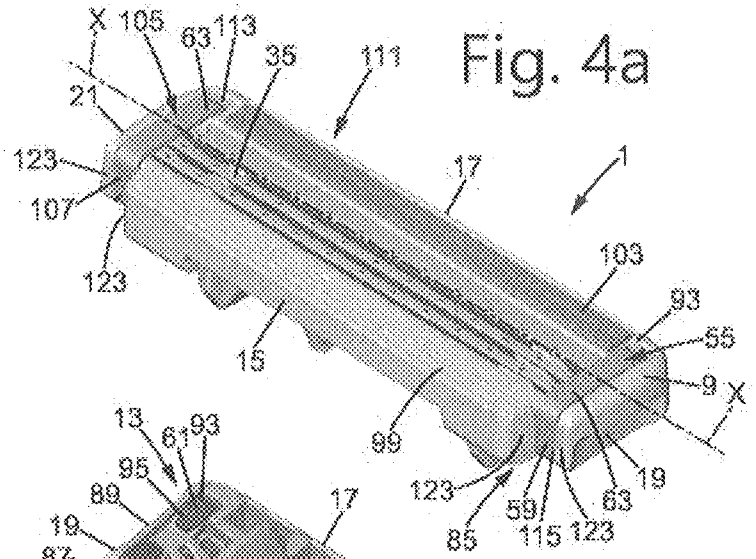
Figure 4B:
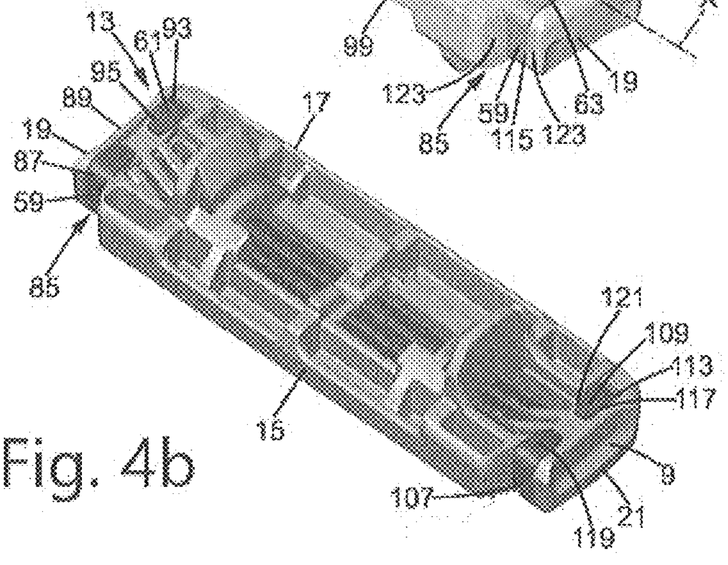

As depicted on FIGS. 1, 2 and 3, the shaving blade cartridge 1 comprises a housing 9. The housing 9 extends along a longitudinal axis X-X. Viewed from the top, the housing 9 has a generally rectangular shape. However, in some embodiments, the general shape of the housing 9 may be different, and for example the housing 9 could have an oval shape. The housing 9 comprises a top side 111, a bottom side 13 opposite to the top side 111 and a first and second longitudinal side 15, 17. For example, the bottom side 13 is adapted to be arranged in front of the handle 7 whereas the top side 111 is arranged opposite to the handle 7. The top side 111 and the bottom side 13 may be parallel to each other. The first longitudinal side 15 extends along the longitudinal axis X-X. The second longitudinal side 17 and the first longitudinal side 15 are facing each other. The second longitudinal side 17 may be approximately parallel to the first longitudinal side 15, especially when the first and second longitudinal sides 15, 17 are flat. The second longitudinal side 17 also extends along the longitudinal axis X-X. The first and the second longitudinal side 15, 17 each extend in a lateral direction Z along a lateral axis Z-Z, between the top side 111 and the bottom side 13 of the housing 9. The first side 15 can be forward or rearward of the blade edges according to the embodiment.

The housing 9 may also comprise, as best seen in FIG. 2, first and second lateral sides which extend between the first and second longitudinal sides 19, 21, along a transversal axis Y-Y, the transversal axis Y-Y being, for example, orthogonal to the longitudinal axis X-X and to the lateral axis Z-Z. The first and second lateral sides 19, 21 are arranged, in the lateral direction Z, between the top side 111 and the bottom side 13. The first and second lateral and longitudinal sides 15, 17, 19, 21 form together the external surface of the housing 9. The first and second lateral sides 19, 21 both join the longitudinal ends 23, 25 of the first and second longitudinal sides 15, 17. In a similar way, the first and second longitudinal sides 15, 17 both join the free ends 27, 29 of the first and second lateral sides 19, 21.

The housing 9 can be made of a plastic material, in particular a virgin (non-recycled) plastic material (such as ABS copolymers or polyphenylene oxide blends) or a recycled plastic material. However, as will be discussed below in more detail, the present disclosure is particularly useful when using a recycled plastic material which is desirable from an environmental point of view. However, other materials may be used, in particular material compositions comprising a recycled plastic material, in particular material compositions comprising a non-recycled plastic material and a recycled plastic material.

The housing 9 also comprises a blade receiving section 33, as represented in FIG. 2. The blade receiving section 33 or blade receiving area may have a (generally or exactly) rectangular shape. The blade receiving section 33 is arranged on the top side 111 of the housing 9. The blade receiving section 33 defines a recess and is adapted to receive at least one cutting blade 35 (in particular three, four or five blades). As depicted on FIGS. 1, 2, 3 and 4, the shaving blade cartridge 1 may comprise three cutting blades 35. The blades 35 are mounted in the housing 9 in the blade receiving section 33 between the first and second longitudinal sides 15, 17 of the housing and between the first and second lateral sides 19, 21 of the housing 9. As shown in FIGS. 1, 2, 3 and 4, each blade 35 extends longitudinally along the longitudinal axis X-X. Each cutting blade 35 comprises a first and second end 37, 39 along the longitudinal axis X-X. The first end 37 of the cutting blades 35 is directed toward the first lateral side 19 of the housing 9, whereas the second end 39 of the cutting blade 35 is directed toward the second lateral side 21 of the housing 9. Each cutting blade 35 comprises a cutting edge 41. The cutting edge 41 extends along the longitudinal axis X-X. The cutting edge 41 of the cutting blade 35 is accessible at the top side 111 of the housing 9 to cut hair during shaving.

For example, the cutting blades 35 are L-shaped such as represented on FIGS. 2 and 3. The cutting blades 35 thus have a cutting edge portion 43, a guided portion 45, and a bent portion 47 which is intermediate to the cutting edge portion 43 and the guided portion 45. The cutting edge portion 43 extends along a cutting edge portion axis. In examples, the cutting edge portion axis of all cutting blades 35 are positioned parallel to each other.

The cutting blades 35 are movably mounted in the blade receiving section 33 such that they can at least slightly, for example at least 0.1 mm, more specifically at least 0.3 mm, and for example up to 2 mm, more specifically up to 1 mm, move in Z direction. Each cutting blade 35 is supported (or carried) by two elastic fingers 49, 51. The elastic fingers 49, 51 shown in FIG. 2 do not show the details of the present disclosure and should only be understood as showing how the cutting blades 35 can be movably mounted in the blade receiving section 33. The principles of the present disclosure and specific embodiments how the elastic fingers may be designed will be described in more detail below.

The elastic fingers 49, 51 can be molded as a single piece with the housing 9 and can extend in the blade receiving section 33 towards each other and upwardly from both lateral sides 19, 21 of the housing 9. As shown on FIG. 3, the guided portions 45 of the cutting blades 35 are slidingly guided in slots 53 provided in the housing 9. For example, each cutting blade 35 can be a supported blade having its cutting edge 41 fixed on a blade support 57 which comprises the guided portion 45 and the bent portion 47. In this case the blade support 57 is carried by the elastic fingers 49, 51. However, in some other embodiments (not shown on the figures) the blades could be bent blades, as described for instance in patent application WO2013/050606.

In examples, the finger 49, 51 is designed such that the cutting blade 35 is supported by at least one first contact point or area 11 of the finger 49, 51 when the at least one cutting blade 35 is in the first position, wherein the cutting blade 35 is supported by at least one second contact point or area 12 of the finger 49, 51 when the at least one cutting blade 35 is in the second position. Alternatively, or in addition, the finger 49, 51 has an at least partially curved surface on a side facing the at least one cutting blade. As mentioned in the Summary Section above, an aspect of this design is that recycled plastic materials can be used for manufacturing the housing and the fingers while still having good elastic properties of the fingers for supporting the blades.

Figure 6A:
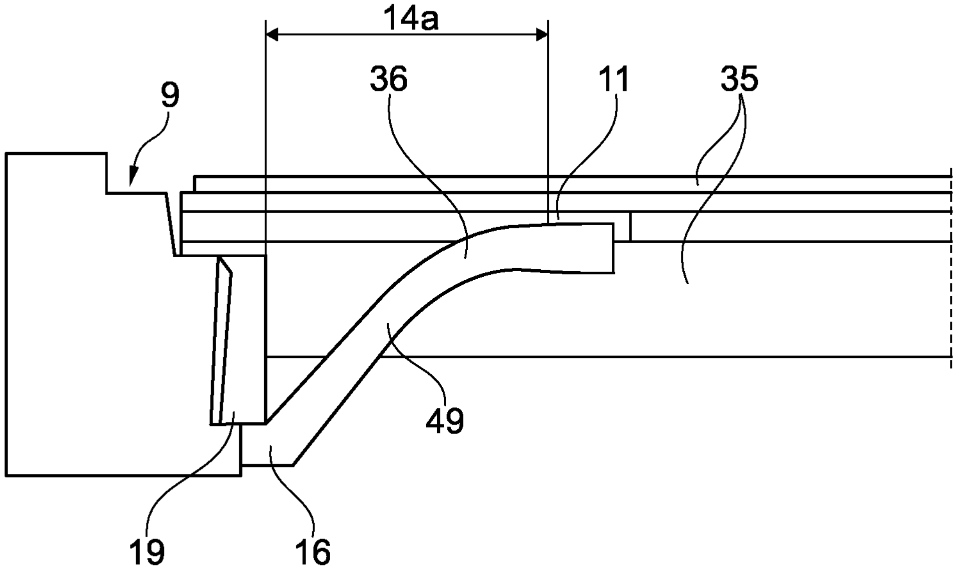
FIG. 6*a* shows a cross-sectional view showing a finger in the first position of the cutting blade.
Figure 6B:
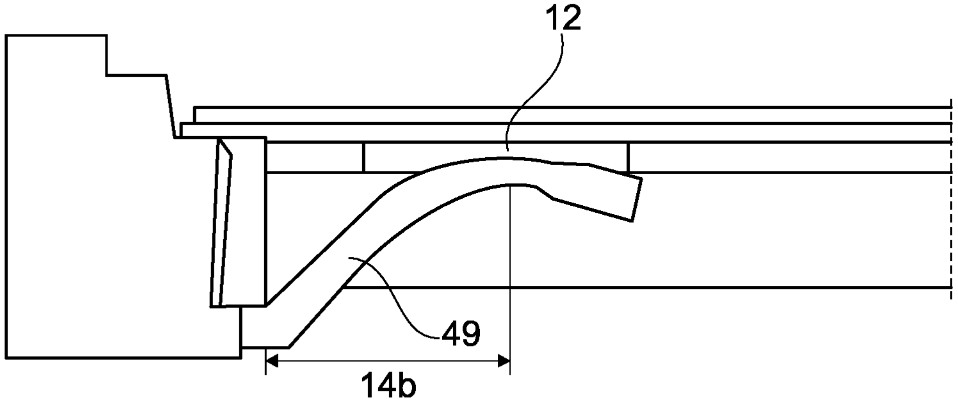
FIG. 6*b* shows a cross-sectional view showing a finger in a second position of the cutting blade.

FIGS. 6*a* and 6*b* are cross-sectional views showing a finger 49 in the first position of the cutting blade 35 and the finger in a second position of the cutting blade, respectively. The first position (FIG. 6*a*) of the cutting blade 35 is a position in which the at least one cutting blade is held in the blade receiving section of the housing without any external forces acting on the cutting blade. The second position (FIG. 6*a*) of the cutting blade is a position in which the cutting blade is held in the blade receiving section of the housing in a retracted position with an external force acting on the cutting blade such that the fingers supporting the at least one cutting blade are moved or bent towards the bottom side of the housing.

In the second position (FIG. 6*b*), the cutting blade is moved towards the bottom side of the housing in examples by at least 0.3 mm-0.7 mm. Of course, intermediate positions may occur between the first and second positions. In addition, a cutting blade does not need to move towards the bottom side of the housing on both sides to the same extent. Due to the elastic support provided by the fingers, a cutting blade may also have a slightly tilted position within the housing caused by unevenly distributed forces acting on the cutting blade.

As can be seen in FIGS. 6*a* and 6*b*, the finger 49 is moved downwardly when the cutting blade is moved downwardly due to forces acting on the cutting blade. The finger 49 provides a single contact point or area with respect to the cutting blade 35 which continuously transitions or moves from the first contact point or area 11 to the at least one second contact point or area 12 when the at least one cutting blade is moved from the first position to the second position. Said in other words, the contact point or area provided by the curved section of the finger is continuously moving during use towards the base 16 of the finger (i.e. the connection point of the finger with respect to the housing) due to the curved structure or surface 36 of the finger. In that way the torque is continuously changing as the lever arm decreases.

The finger shown in FIGS. 6*a* and 6*b* only has a partially curved structure or surface 36, whereas the section of the finger between the lateral side 19 of the housing and the curved structure or surface 36 may be straight. Also, the section beyond the first contact point or area 11 may be straight. However, it should be understood that the entire finger may have a curved structure. In examples, the section of the finger between the first and second contact points or areas 11, 12 has a curved structure or surface.

The second contact point or area 12 is closer to the neighboring lateral side 19 of the housing on which the respective finger is connected to the housing compared to the first contact point 11. In particular, the distance between the first contact point or area and the at least one second contact point or area on the finger may be between 0.2 mm-0.6 mm and more specifically 0.45 mm. The lever arm distance 14*b* provided by the finger is thus reduced when the at least one cutting blade is in the second position compared to the lever arm distance 14*a* provided by the finger when the at least one cutting blade is in the first position, wherein the lever arm distance 14*a* is defined as being the distance between the surface of the neighboring lateral side 19 facing towards the blade receiving section and the first contact point or area of the finger when the at least one cutting blade is in the first position measured in a direction extending parallel to the cutting blade in its first position, and wherein the lever arm distance 14*b* is defined as being the distance between the surface of the neighboring lateral side 19 facing towards the blade receiving section and the second contact point or area of the finger when the at least one cutting blade is in the at least one second position measured in a direction extending parallel to the cutting blade in its first position.

Figure 7:
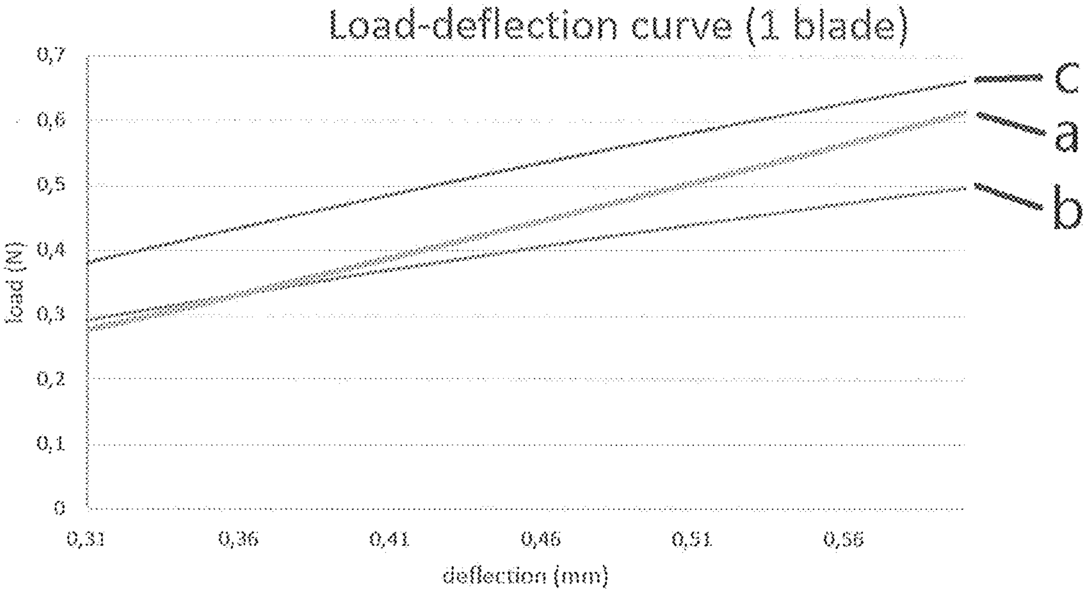
FIG. 7 shows three load-deflection curves of three different fingers including a finger according to an example.

FIG. 7 shows load-deflection curves of loads acting on a single finger. The load deflection curve of a conventional finger made of virgin (non-recycled) plastic material (ABS HG 760 GP) is indicated by the curve c. The load deflection curve of a conventional finger made of recycled plastic material (Rec. PP—Moplen Filler 16%) is indicated by the curve b. And the load deflection curve of a finger made of recycled plastic material (Rec. PP—Moplen Filler 16% and substantially as disclosed herein is indicated by the curve a.

As can be seen, the finger having a conventional finger made of recycled plastic material has reduced elastic properties compared to a conventional finger (having the same size and shape) made of virgin plastic material. Contrary to that, the new finger design as disclosed herein has mechanical properties at a higher deflection which are closer to a conventional design made of virgin plastic, although the new finger is made of recycled plastic, especially in case of a higher deflection, in particular above a deflection of 2.8 mm, i.e. toward the right side of the FIG. 7.

Therefore, the present disclosure allows the use of recycled plastics for the production of razor heads for movable blades. The use of recycled plastics assures that a non-renewable source (such as fossil-fuels) are used for the production of razor heads. Furthermore, the proposed solutions tackles the problem of the recycled plastics inferior mechanical properties, by providing a novel solution that compensates the non-linear stress-strain behaviour of recycled plastics to assure a linear and controlled retraction of the blade when pressure is applied.

It should be understood that the cutting blade is movably supported on each of its two lateral sides of the housing within the blade receiving section by a single finger, i.e. in total by two fingers. In case of more cutting blades, the number of fingers increases accordingly. As an example, in case of three cutting blades, six fingers are provided (three on each lateral housing side), and in case of five cutting blades, ten fingers are provided (five on each lateral housing side).

The housing and the fingers may be formed together by an injection molding process. The housing and the fingers are at least partially or completely made of a recycled plastic material, in particular a material composition comprising one or more recycled plastic materials, or a material composition comprising a non-recycled plastic material and a recycled plastic material. However, the design disclosed herein can—of course—also be realized by using a virgin (i.e. non-recycled) plastic material.

What is claimed is:

1. A shaving blade cartridge comprising a housing and a cutting blade mounted in a blade receiving section of the housing between first and second lateral sides of the housing, wherein the cutting blade is movably supported by a finger such that the cutting blade can move from a first position to a second position, wherein a base of the finger is connected to one of the first or second lateral sides of the housing, wherein the finger is designed such that the cutting blade is:

1) in direct contact with a first contact point or area of the finger when the cutting blade is in the first position, wherein the first position is when the cutting blade is at rest, 2) not in direct contact with a second contact point or area of the finger when the cutting blade is in the first position, 3) in direct contact with the second contact point or area of the finger when the cutting blade is in the second position, wherein the second position is when the cutting blade is fully retracted, and 4) not in contact with the first contact point or area when the cutting blade is in the second position, wherein the finger includes an intermediate portion located between the first contact point or area and the second contact point or area such that there is a distance between the first contact point or area and the second contact point or area.

2. A shaving blade cartridge according to claim 1, wherein the finger has an at least partially curved portion on a side facing the cutting blade, and wherein the second contact point or area is defined by the at least partially curved portion.

3. A shaving blade cartridge according to claim 1, wherein the finger is always in contact with the cutting blade such that the contact between the finger and the cutting blade continuously transitions or moves from the first contact point or area to the second contact point or area when the cutting blade is moved from the first position to the second position.

4. A shaving blade cartridge according to claim 1, wherein the second contact point is closer to a closest lateral side of the first lateral side or the second lateral side than the first contact point.

5. A shaving blade cartridge according to claim 1, wherein the distance between the first contact point or area and the at least one second contact point or area on the finger is between 0.2 mm-0.6 mm.

6. A shaving blade cartridge according to claim 5, wherein the distance is between 0.3-0.5 mm.

7. A shaving blade cartridge according to claim 6, wherein the distance is 0.45 mm.

8. A shaving blade cartridge according to claim 1, wherein the cutting blade extends along or in parallel to a longitudinal axis of the housing.

9. A shaving blade cartridge according to claim 1, wherein the finger is a first finger on the first lateral side of the housing, and the housing further includes a second finger on the second lateral side of the housing, and the cutting blade is movably supported on the first lateral side by the first finger and on the second lateral side by the second finger.

10. A shaving blade cartridge according to claim 1, wherein the housing and the finger are completely made of a recycled plastic material, in particular a material composition comprising one or more recycled plastic materials, or at least partially made of a recycled plastic material, in particular a material composition comprising a non-recycled plastic material and a recycled plastic material.

* * * * *